(12) United States Patent
Yasui et al.

(10) Patent No.: US 8,694,917 B2
(45) Date of Patent: Apr. 8, 2014

(54) MOBILE INFORMATION COMMUNICATION TERMINAL PROGRAM AND RECORDING MEDIUM CONTAINING THE PROGRAM

(75) Inventors: Shigeya Yasui, Kanagawa (JP); Kayo Sasaki, Tokyo (JP); Emi Arakawa, Tokyo (JP); Mayu Irimajiri, Tokyo (JP)

(73) Assignees: Sony Corporation, Tokyo (JP); Sony Mobile Communications, Inc., Tokyo (JP)

( * ) Notice: Subject to any disclaimer, the term of this patent is extended or adjusted under 35 U.S.C. 154(b) by 556 days.

(21) Appl. No.: 10/487,161

(22) PCT Filed: Jun. 20, 2003

(86) PCT No.: PCT/JP03/07889
§ 371 (c)(1),
(2), (4) Date: Sep. 27, 2004

(87) PCT Pub. No.: WO04/001571
PCT Pub. Date: Dec. 31, 2003

(65) Prior Publication Data
US 2005/0037814 A1 Feb. 17, 2005

(30) Foreign Application Priority Data
Jun. 20, 2002 (JP) .................. 2002-179563

(51) Int. Cl.
*G06F 3/048* (2013.01)
(52) U.S. Cl.
USPC ........... 715/810; 715/817; 715/819; 715/820; 715/822; 715/825; 715/828; 715/829; 715/830; 715/844
(58) Field of Classification Search
USPC ............... 455/566, 575.1; 715/810, 817, 819, 715/822, 825, 828, 829, 830, 864
See application file for complete search history.

(56) References Cited

U.S. PATENT DOCUMENTS 6,121,968 A * 9/2000 Arcuri et al. .................. 715/825
6,239,803 B1 * 5/2001 Driskell ........................ 715/810
(Continued)

FOREIGN PATENT DOCUMENTS

EP 0 623 870 11/1994
EP 0 792 056 8/1997
(Continued)

OTHER PUBLICATIONS

Microsoft Office Outlook 2003 (11.6568.6568) SP2, Part of Microsoft Office Professional Edition 2003.*

(Continued)

*Primary Examiner* — Steven Sax
*Assistant Examiner* — Anil N. Kumar
(74) *Attorney, Agent, or Firm* — Frommer Lawrence & Haug LLP; William S. Frommer; Ellen Marcie Emas

(57) ABSTRACT

In menu structure, information is separately displayed on a menu item-by-menu item basis. Therefore, the adoption of menu structure involves inconvenience. (For example, pieces of information under different menu items cannot be viewed at the same time.) A portable information communication terminal eliminates this inconvenience. Information is configured in list structure wherein items (A1, . . . , A5, B1, . . . , B4, B5, B6, C1, . . . , C5, D1, . . . (A to D represent groups.)) are arranged in succession. List information (B5 to C5) which is within a predetermined range (the second precedent line through the fourth subsequent line) from a specific item C1 of a predetermined serial number (top number) in a selected group (group C) is displayed. Since the top item in group C is the specific item, items corresponding to group B are also displayed. Thus, items corresponding to different groups (group B and group C) can be displayed at the same time.

9 Claims, 18 Drawing Sheets

(56) References Cited

U.S. PATENT DOCUMENTS

| | | | |
|---|---|---|---|
| 6,734,883 B1* | 5/2004 | Wynn et al. | 715/830 |
| 6,934,911 B2* | 8/2005 | Salmimaa et al. | 715/744 |
| 6,957,397 B1* | 10/2005 | Hawkins et al. | 715/856 |
| 6,966,037 B2* | 11/2005 | Fredriksson et al. | 715/830 |
| 2002/0057298 A1* | 5/2002 | Wassom et al. | 345/825 |
| 2002/0122080 A1* | 9/2002 | Kunii et al. | 345/864 |
| 2003/0013483 A1* | 1/2003 | Ausems et al. | 455/556 |
| 2006/0242596 A1* | 10/2006 | Armstrong | 715/786 |

FOREIGN PATENT DOCUMENTS

| | | |
|---|---|---|
| JP | 6-4208 | 1/1994 |
| JP | 9-233161 | 9/1997 |
| JP | 10-240693 | 9/1998 |
| JP | 11-136336 | 5/1999 |
| JP | 11-175215 | 7/1999 |
| JP | 2000-22788 | 1/2000 |
| JP | 2000-67059 | 3/2000 |
| JP | 2002-141997 | 5/2002 |
| WO | WO 02/31641 | 4/2002 |

OTHER PUBLICATIONS

Microsoft Outlook 2000 Documentation attahed as a NPL: A Book, citing its copyright information. Title: An Idiot's Guide to Mircrosoft Office 2000; Author—Joe Kraynak; Publication—First Print; Date—Mar. 1999; Publisher—QUE corporation. Pertinent pp. 223-225.*

* cited by examiner

F I G. 1
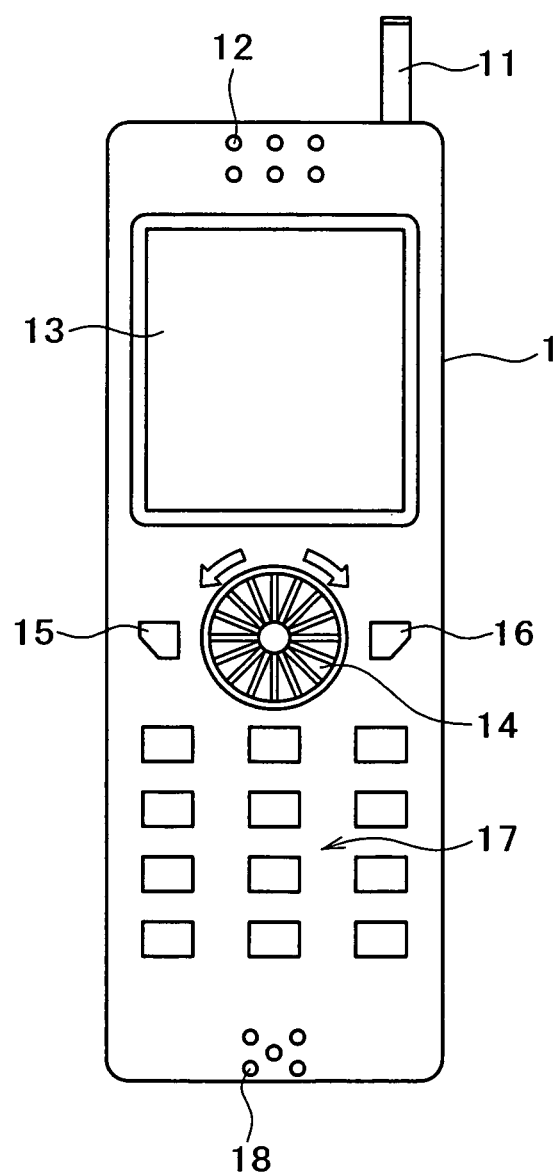

F I G. 9
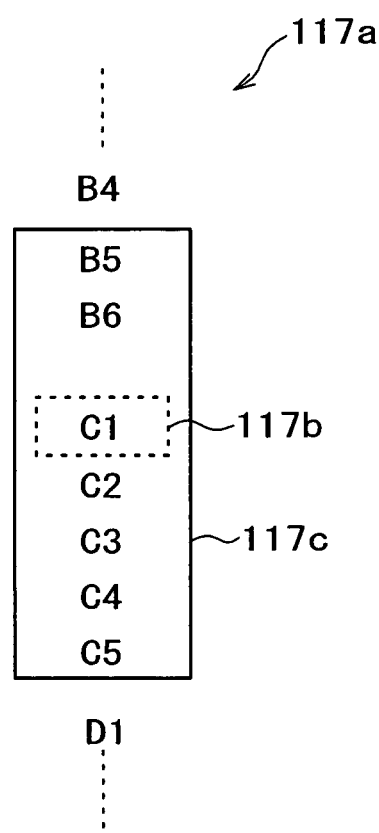

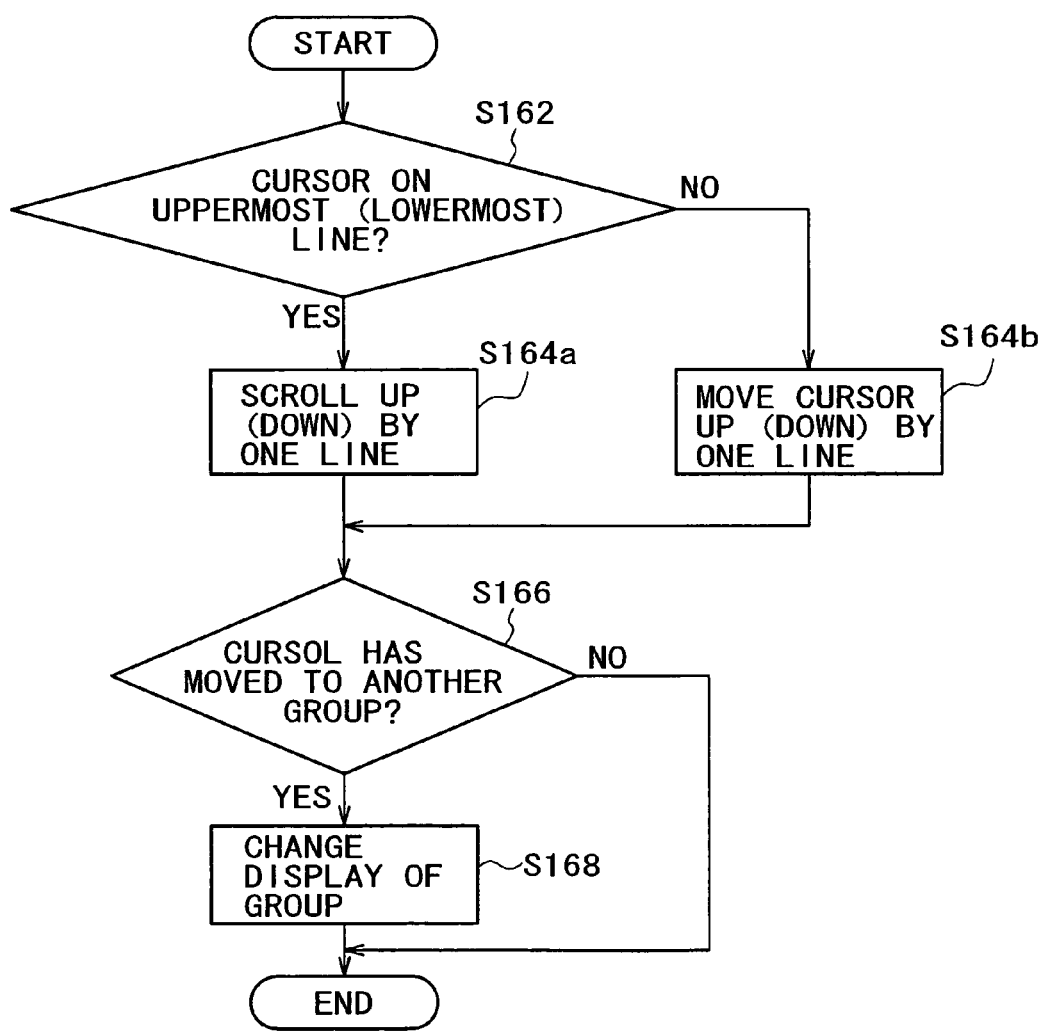
F I G. 1 5

MOBILE INFORMATION COMMUNICATION TERMINAL PROGRAM AND RECORDING MEDIUM CONTAINING THE PROGRAM

PARTIES TO A JOINT RESEARCH AGREEMENT

This Application is a result of activities undertaken within the scope of a Joint Research Agreement between Sony Corporation and Telefonaktiebolaget L.M. Ericsson.

BACKGROUND OF THE INVENTION

1. Field of the Invention

The present invention relates to screen display in a portable information communication terminal such as a cellular phone.

2. Description of Related Art

In a portable information communication terminal such as a cellular phone, information and the like obtained through the Internet have been conventionally displayed on a screen. If there is too much information to be displayed, only part of the information can be displayed on a screen sometimes. To cope with this, menu structure is adopted to display information the user wants.

Referring to FIG. 19, a mode of displaying information wherein menu structure is adopted according to prior art will be described. A menu 310 is displayed on the screen 300 of a cellular phone. The menu 310 contains three different menu items, A, B, and C, and the user selects any one of them. In the example in FIG. 19, the user uses a cursor to select "B." When the menu item is selected, information corresponding to the menu item is displayed. In this case, B1, B2, and B3 corresponding to menu item "B" are displayed on the screen 300. If menu item "A" is selected, A1, A2, and A3 are displayed on the screen 300; if menu item "C" is selected, C1, C2, C3, and C4 are displayed.

As mentioned above, if menu structure is adopted, the user can display information the user wants and specifies. For example, if the user desires to display information B2, the user only has to select menu item "B." However, with menu structure, the user has difficulty in grasping how many pieces of information there are. If the user selects a menu item to display pieces of information and totalizes them, the user can grasp the number of pieces of information (e.g. 3+3+4=10). However, this is troublesome.

Pieces of information corresponding to different menu items cannot be simultaneously displayed. For example, the user cannot display information A3 and information B1 at the same time.

As mentioned above, if menu structure is adopted, pieces of information are separately displayed on a menu item-by-menu item basis. This causes inconvenience.

SUMMARY OF THE INVENTION

Consequently, the present invention is intended to eliminate inconvenience associated with menu structure, i.e. inconvenience resulting from that pieces of information are separately displayed on a menu item-by-menu item basis.

The present invention relates to a portable information communication terminal. A portable information communication terminal according to the present invention comprises a list information recording means, a group selecting means, and a list information reading means.

The list information recording means records list information wherein individual items are related to groups and provided with serial numbers. The group selecting means selects a group. The list information reading means reads out list information which corresponds to a selected group and is within a predetermined range from a specific item of a predetermined serial number in the selected group. The list information is read out as read list information.

According to the invention constituted as mentioned above, the list information reading means reads out list information within a predetermined range from a specific item of a predetermined serial number in a selected group as read list information. In general, list information within a predetermined range from a specific item contains items corresponding to different groups. Therefore, items corresponding to different groups can be displayed at the same time.

BRIEF DESCRIPTION OF THE DRAWINGS

FIG. 8 is a drawing illustrating an example of list information 117a;

FIG. 9 is a drawing illustrating the process of reading out list information;

FIG. 15 is a flowchart illustrating the details of first scrolling process (S16);

FIG. 19 is a drawing illustrating the mode of displaying information wherein menu structure is adopted according to prior art.

DETAILED DESCRIPTION OF THE PREFERRED EMBODIMENTS

Figure 2:
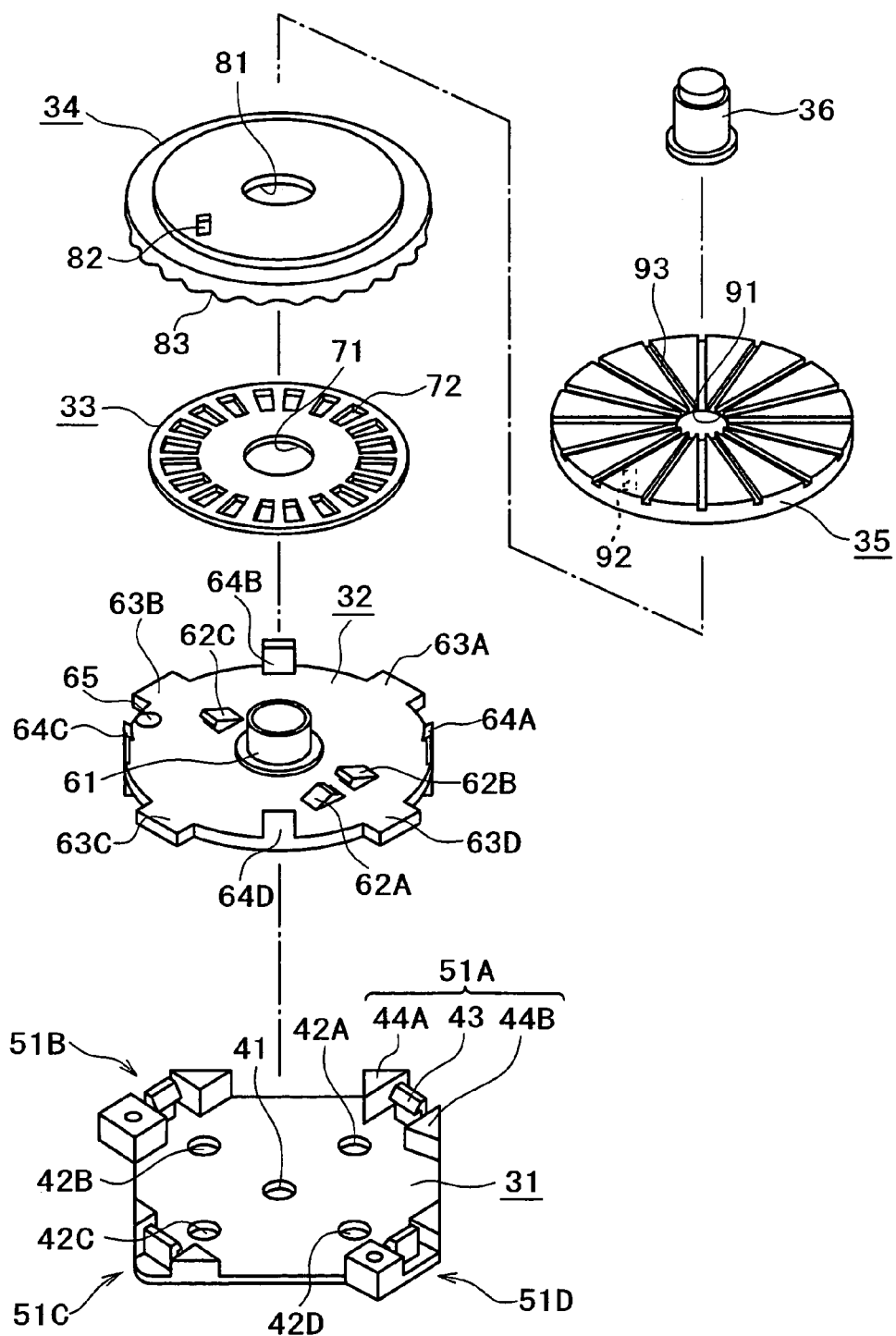
FIG. 2 is an exploded perspective view illustrating a rotary input portion 14.

Referring to the drawings, embodiments of the present invention will be described below.

Figure 1:
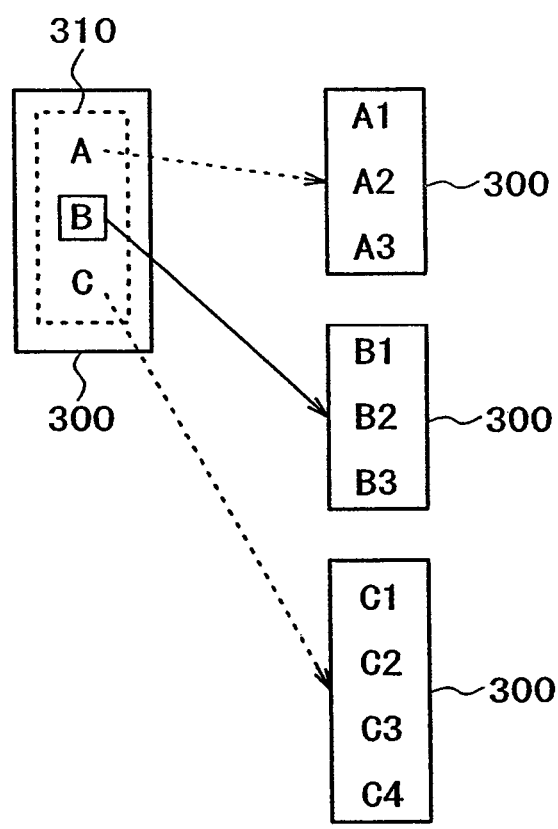
FIG. 1 is an outside drawing illustrating an example of the constitution of a cellular phone 1 to which the present invention is applied.

FIG. 1 is an outside drawing illustrating an example of the constitution of a cellular phone 1 to which the present invention is applied.

The cellular phone 1 is provided substantially in the center thereof with a substantially disk-shaped rotary input portion 14. As illustrated by hollow arrows, the rotary input portion 14 is so constituted that it is rotatable clockwise or counterclockwise on a rotation axis perpendicular to the surface of the sheet of the specification. The user can operate the rotary input portion 14, the conversation button 15 and power button 16 respectively located on the left and right of the rotary input portion 14, and the numeric keypad 17 located thereunder to input various commands.

With the cellular phone 1 illustrated in FIG. 1, the user performs various operations, viewing the display unit 13 consisting of LCD (Liquid Crystal Display) and the like. For example, the user turns the rotary input portion 14 or presses specified areas on the upper face (flat face) of the rotary input portion 14 down toward the interior of the cellular phone 1. Thereby, the user can scroll, for example, the display of today's news downloaded through the Internet.

A speaker 12 and a microphone 18 are provided in proximity to the upper end and lower end of the front face of the cellular phone 1, respectively. When making a telephone call, the user utilizes these items. On the upper end face of the cellular phone 1, an antenna 11 is installed as is protruded from the enclosure.

The cellular phone 1 is not limited to so-called straight type, illustrated in FIG. 1. The cellular phone may be so constituted that it can be folded on hinges. In this case, a first enclosure provided with a display unit 13 and a second enclosure provided with a rotary input portion 14 and a numeric keypad 17 are folded up.

FIG. 2 to FIG. 5 illustrate an example of the structure of the rotary input portion 14.

As illustrated in FIG. 2, the rotary input portion 14 basically comprises a base 31, a holder 32, a scale 33, a dial main body 34, an operation dial 35, and a central button member 36.

The base 31 is made of, for example, insulating resin and formed as a substantially rectangular plate. A center button 41 is provided in the center on the upper face of the base 31, and peripheral buttons 42A to 42D are placed therearound at equal intervals. The base 31 is disposed so that the line connecting the peripheral button 42A and the peripheral button 42C will be substantially in parallel with the center line of the cellular phone 1 in FIG. 1 in the vertical direction. Therefore, the peripheral button 42A is positioned on the upper side on the cellular phone 1 illustrated in FIG. 1, and the peripheral button 42B is positioned on the left side. The peripheral button 42C is positioned on the lower side on the cellular phone 1 illustrated in FIG. 1, and the peripheral button 42D is positioned on the right side. (Hereafter, the peripheral button 42A will be referred to as "upper button 42A"; the peripheral button 42B as "left button 42B"; the peripheral button 42C as "lower button 42C"; and the peripheral button 42D as "right button 42D" as appropriate.)

An upward movement arresting members 43 is provided with a lug extending toward the center of the base 31. The upward movement of the holder 32 is arrested by the lug. On both sides of the upward movement arresting member 43, rotation arresting members 44A and 44B are provided slightly away from the arresting member 43. The rotation of the holder 32 is arrested by the rotation arresting members 44A and 44B. The upward movement arresting member 43 and the rotation arresting members 44A and 44B constitute a holder arresting portion 51A, which is disposed at a corner of the base 31. The same (holder arresting portion 51B, 51C, and 51D) is disposed at the three remaining corners.

The holder 32 is formed as an insulating disk having a hole in the center thereof. In the center of the upper face thereof, a dial holding cylinder 61 is formed for rotatably holding the dial main body 34 and the like. The dial holding cylinder 61 is so formed that it is protruded from the vicinity of the hole upward (the upper side in FIG. 2). Therefore, the axis of the hole in the dial holding cylinder 61 is matched with the axis of the rotation of the dial main body 34 and the like.

On the upper face of the holder 32, brushes 62A, 62B, and 62C which are of conductive elastic material are placed. Change in the state of electrical connection between the brushes 62A, 62B, and 62C and the scale 33 placed on the holder 32 is detected. Thereby, the amount and direction of rotation of the rotary input portion 14 (operation dial 35) are detected.

More specific description will be given. The brushes 62A and 62B are disposed so that their positions in the radial direction will provide contact with slits 72 in the scale 33. That is, when the scale 33 is placed on the holder 32, the brushes 62A and 62B are brought into contact with slits 72 in the scale 33. When the rotary input portion 14 is operated and turned and accordingly the scale 33 is rotated, the brushes 62A and 62B and the scale 33 are repeatedly brought into contact and out of contact with each other. In contact state, the brushes 62A and 62B are in a position between one slit 72 and another 72. In non-contact state, the brushes 62A and 62B are in a position corresponding to a slit 72.

The brush (earth brush) 62C is disposed in a position where the brush 62C is kept in contact with the scale 33 when the scale 33 is placed on the holder 32. Thus, when the scale 33 is rotated, continuity is repeatedly provided and removed between the brush 62c and the brush 62A or 62B through the scale 33.

Thus, pulses are produced in correspondence with change in the state of continuity between the brush 62A or 62B and the brush 62C (the repetition of contact and non-contact between the brush 62A or 62B and the scale 33). Based on the number of the pulses, the amount of rotation of the rotary input portion 14 can be calculated.

The brush 62A and the brush 62B are disposed so that they are displaced from each other in the circumferential direction. Thus, the direction of rotation of the rotary input portion 14 can be detected. As an example, it is assumed that the rotary input portion 14 in FIG. 1 is turned counterclockwise. The leading edge (or falling edge) of a pulse generated by contact of the brush 62A with the scale 33 is detected earlier than the leading edge (or falling edge) of a pulse generated by contact of the brush 62B with the scale 33. This time lag is equivalent to the positional deviation between the brush 62A and the brush 62B.

As a further example, it is assumed that the rotary input portion 14 is turned clockwise. In this case, the leading edge (falling edge) of a pulse generated by contact of the brush 62B with the scale 33 is detected earlier than the leading edge (or falling edge) of a pulse generated by contact of the brush 62A with the scale 33.

Therefore, based on the time lag in the occurrence of the leading edges (or falling edges) of pulses, the direction of rotation of the rotary input portion 14 is detected.

In the peripheral area of the holder 32, arrested members 63A to 63D are formed in correspondence with the holder arresting portions 51A to 51D. When the holder 32 is placed on the base 31, the displacement (rotation and dislodgment) of the arrested members 63A to 63D is arrested by the holder arresting portions 51A to 51D, respectively.

Figure 3:
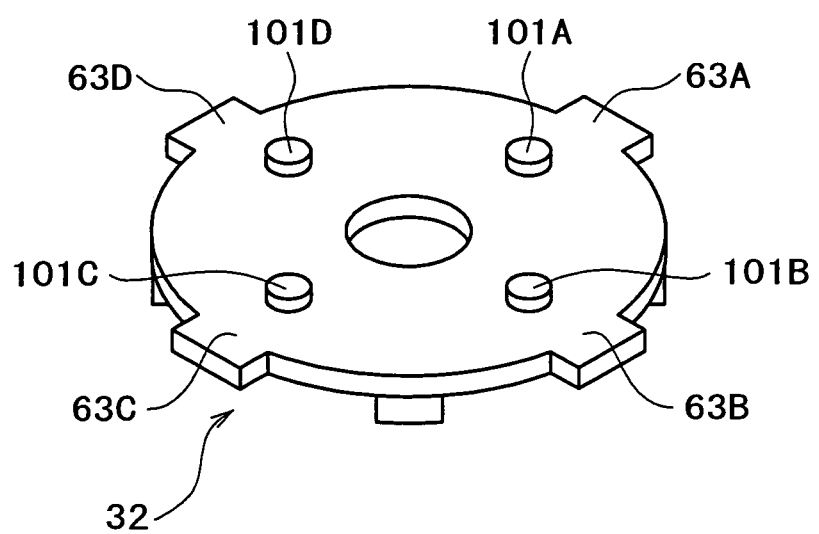
FIG. 3 is a perspective view illustrating the underside of a holder 32.

As illustrated in FIG. 3, projections 101A to 101D for button depression are formed on the underside of the holder 32 in positions corresponding to the peripheral buttons 42A to 42D. Therefore, when the upper part of the rotary input portion 14 in the cellular phone 1, as illustrated in FIG. 1, is depressed in the direction perpendicular to the surface of the sheet of the specification, the upper button 42A (peripheral button 42A) is depressed by the projection 101A for button depression. When the left part of the rotary input portion 14 is depressed, the left button 42B (peripheral button 42B) is depressed by the projection 101B for button depression. When the lower part of the rotary input portion 14 is depressed, the lower button 42C (peripheral button 42C) is depressed by the projection 101C for button depression. When the right part of the rotary input portion 14 is depressed, the right button 42D (peripheral button 42D) is depressed by the projection 101D for button depression.

Dial main body holding members 64A to 64D are formed on the rim of the holder 32 at a predetermined distance therebetween so that the holding members 64A to 64D are protruded from the upper face (upward in the figure). Lugs extending toward the center of the holder 32 are formed at the upper ends of the dial main body holding members 64A to 64D. The dislodgment of the dial main body 34 is prevented by the lugs.

On the upper face of the holder 32, a projection 65 is formed for providing click feeling. When the rotary input portion 14 is turned, the user is provided with click feeling by the projection 65 for click feeling and the uneven portion 83 for click feeling on the dial main body 34.

Figure 4:
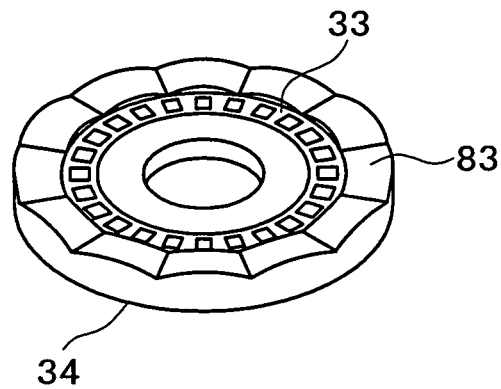
FIG. 4 is a perspective view illustrating the way a scale 33 is secured in a dial main body 34.

A hole 71 into which the dial holding cylinder 61 is to be inserted is formed in the center of the scale 33, and a large number of the slits 71 are formed therearound. As mentioned above, the slits 72 are radially arranged with a predetermined angular pitch, and positioned in proximity to the rim of the scale 33. As illustrated in FIG. 4, the scale 33 is secured on the underside of the dial main body 34 and placed on the holder 32.

A hole 81 into which the dial holding cylinder 61 is to be inserted is formed in the center of the dial main body 34. A power transmission projection 82 is formed on the upper face of the dial main body 34. The power transmission projection 82 is engaged with the power transmission recess 92 formed on the underside of the operation dial 35. The power transmission projection 82 transmits turning force from the operation dial 35 to the dial main body 34.

On the peripheral portion of the underside of the dial main body 34, the uneven (corrugated) portion 83 for providing click feeling, illustrated in FIG. 4, is formed throughout the circumference thereof. As mentioned above, the projection 65 for click feeling is fit into a recess of the uneven portion 83 with play.

A hole 91 into which the central button member 36 is to be inserted is formed in the center of the operation dial 35. A power transmission recess 92 into which the power transmission projection 82 of the dial main body 34 is to be fit is formed on the underside of the operation dial 35. Though the central button member 36 is cylindrical in FIG. 2, it may be spherical. On the upper face of the operation dial 35, a large number of grooves 93 are formed for producing appropriate friction during turning operation for the enhancement of operability. However, the grooves 93 may be omitted.

Figure 5:
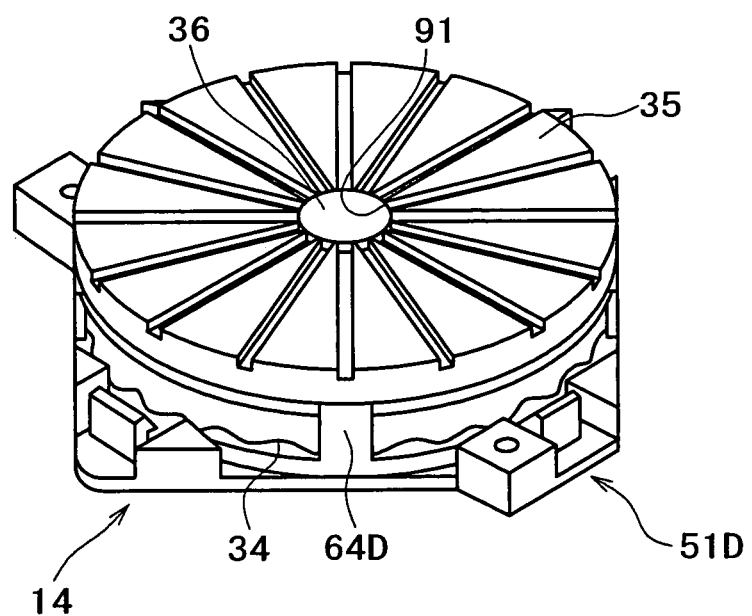
FIG. 5 is a perspective view illustrating the rotary input portion 14.

The rotary input portion 14 illustrated in FIG. 5 is constituted of the above-mentioned members, and is assembled into the cellular phone 1 with the upper face of the operation dial 35 exposed.

With the rotary input portion 14 illustrated in FIG. 5, the user can depress the upper right part of the operation dial 35 (the upper side in FIG. 1) to press the upper button 42A. The user can depress the lower left part of the operation dial 35 (the lower side in FIG. 1) to press the lower button 42C. The user can depress the upper left part of the operation dial 35 (the left side in FIG. 1) to press the left button 42B. The user can depress the lower right part of the operation dial 35 (the right side in FIG. 1) to press the right button 42D.

Figure 6:
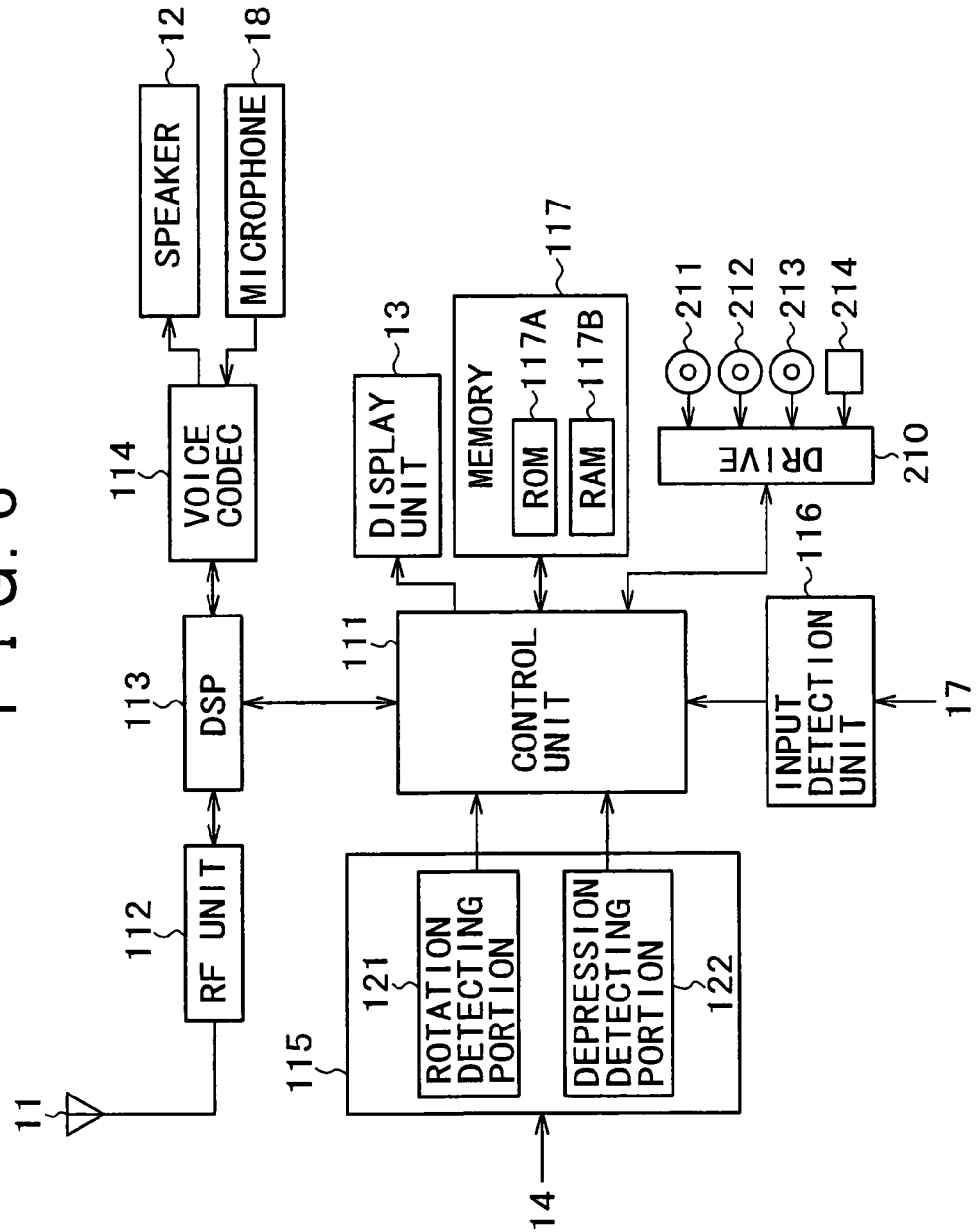
FIG. 6 is a hardware block diagram illustrating an example of the internal constitution of the cellular phone 1 to which the present invention is applied.

FIG. 6 is a hardware block diagram illustrating an example of the internal constitution of the cellular phone 1 to which the present invention is applied.

A control unit 111 loads a control program, stored in ROM (Read Only Memory) 117A in memory 117, into RAM (Random Access Memory) 117B. According to the loaded control program, the control unit 111 controls the operation of the entire cellular phone 1.

For example, according to an instruction from the user, the control unit 111 boots up a program for reading read list information or other purposes, and changes the range displayed on the display unit 13. When the rotation detecting portion 121 of an input detection unit 115 detects input to the rotary input portion 14, that is, when the rotary input portion 14 is turned, the control unit 111 controls DSP (Digital Signal Processor). Thereby, the control unit 111 calculates the amount, direction, and the like of rotation of the rotary input portion 14, and changes the display on the display unit 13. The process in which the control unit 111 changes the display on the display unit 13 in response to input to the rotary input portion 14 will be described later in detail.

An RF (Radio Frequency) unit 112 transmits and receives radio waves to and from base stations through the antenna 11. In voice communication mode, for example, the RF unit 112 amplifies RF signals received through the antenna 11 and subjects the signals to required processing, such as frequency conversion and analog-to-digital conversion. Then, the RF unit 112 outputs the obtained data under voice to the DSP 113. When supplied with data under voice from the DSP 113, the RF unit 112 performs required processing, such as digital-to-analog conversion and frequency conversion. Then, the RF unit 112 transmits the obtained aural signals through the antenna 11.

The DSP 113 subjects data under voice supplied from the RF unit 112 to, for example, inverse spectrum spread, and outputs the obtained data to a voice codec 114. Further, the DSP 113 subjects data under voice supplied from the voice codec 114 to spectrum spread, and outputs the obtained data to the RF unit 112. Furthermore, under control of the control unit 111, the DSP 113 performs varied processing, such as the calculation of an amount of rotation and the direction of rotation, for changing image display.

The voice codec 114 converts the voice of the user collected through the microphone 18 into data under voice, and outputs the data to the DSP 113. Further, the voice codec 114 converts data under voice supplied from the DSP 113 into analog aural signals, and outputs the corresponding aural signals through the speaker 12.

The rotation detecting portion 121 of the input detection unit 115 is connected with the brushes 62A, 62B, and 62C in the FIG. 2. The rotation detecting portion 121 monitors the state of contact or non-contact between the brushes 62A and 62B and the scale 33. Then, the rotation detecting portion 121 outputs pulses corresponding to any change in the state of contact to the control unit 111.

The depression detecting portion 122 of the input detection unit 115 is connected with the center button 41 and the peripheral buttons 42A to 42D in FIG. 2. When any of these buttons is depressed (when the upper face of the rotary input portion 14 is depressed inward), the depression detecting portion 122 detects that, and outputs a corresponding signal to the control unit 111.

The control unit 111 is connected with a drive 210 as required. The drive 210 is loaded with a magnetic disk 211, an optical disk 212, a magnetic optical disk 213, a semiconductor memory 214, or the like as appropriate. Computer programs read out therefrom are installed in the control unit 111 as required. (Such computer programs include a program for implementing a list information reading portion 111a, a cursor position determining portion 111b, a group selecting portion 14a, or the like.)

An input detection unit 116 detects inputs from the conversation button 15, power button 16, numeric keypad 17, and the like provided in the cellular phone 1. Then, the input detection unit 116 outputs corresponding signals to the control unit 111.

Figure 7:
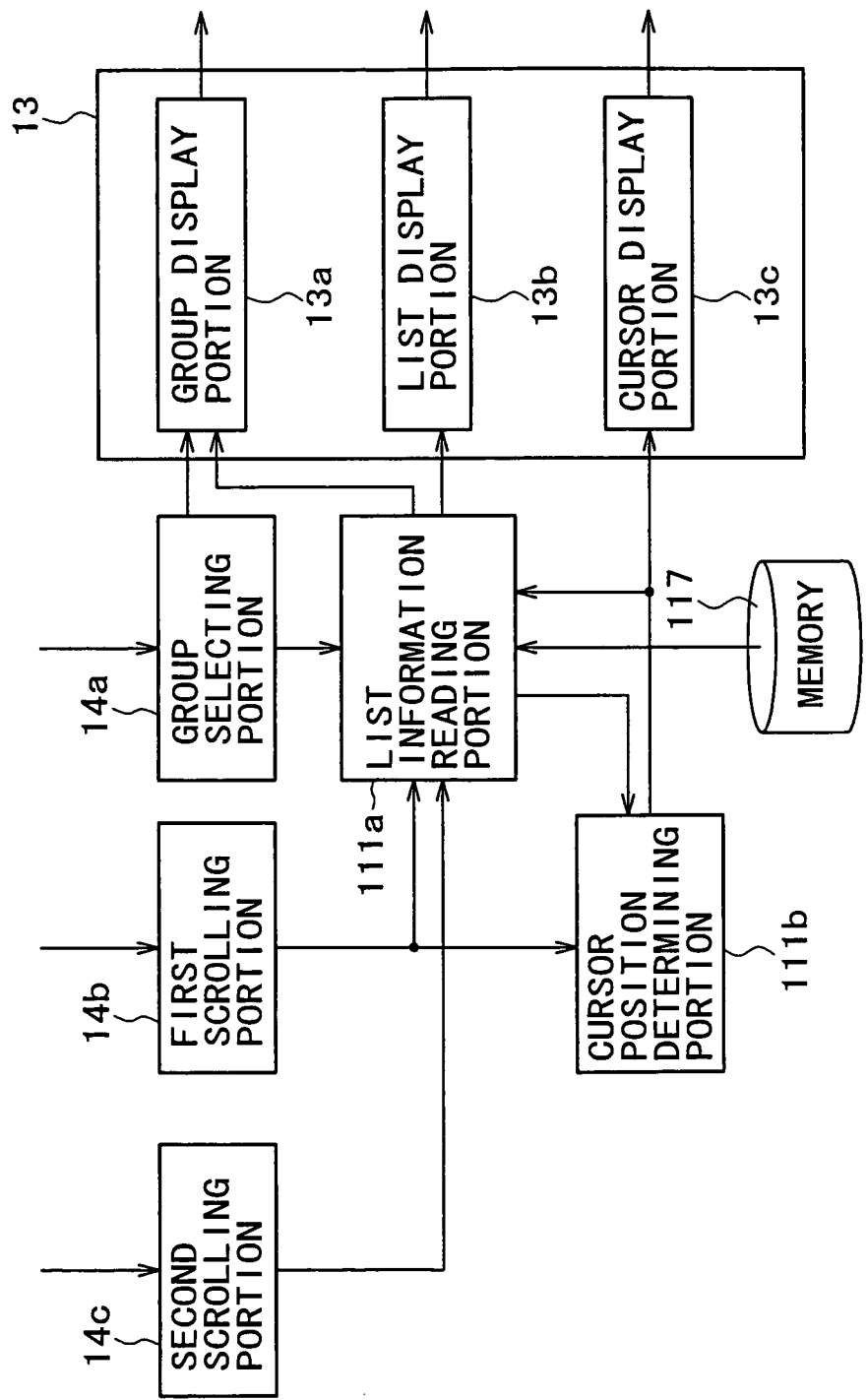
FIG. 7 is a functional block diagram of the cellular phone (portable information communication terminal) 1 according to an embodiment of the present invention.

FIG. 7 is a functional block diagram of the cellular phone (portable information communication terminal) 1 in an embodiment of the present invention. The cellular phone (portable information communication terminal) 1 comprises the display unit 13, the group selecting portion 14a, the first scrolling portion (identifiable item changing means) 14b, the second scrolling portion (specific item changing means) 14c, the list information reading portion 111a, the cursor position determining portion 111b, and the memory 117.

Figure 8:
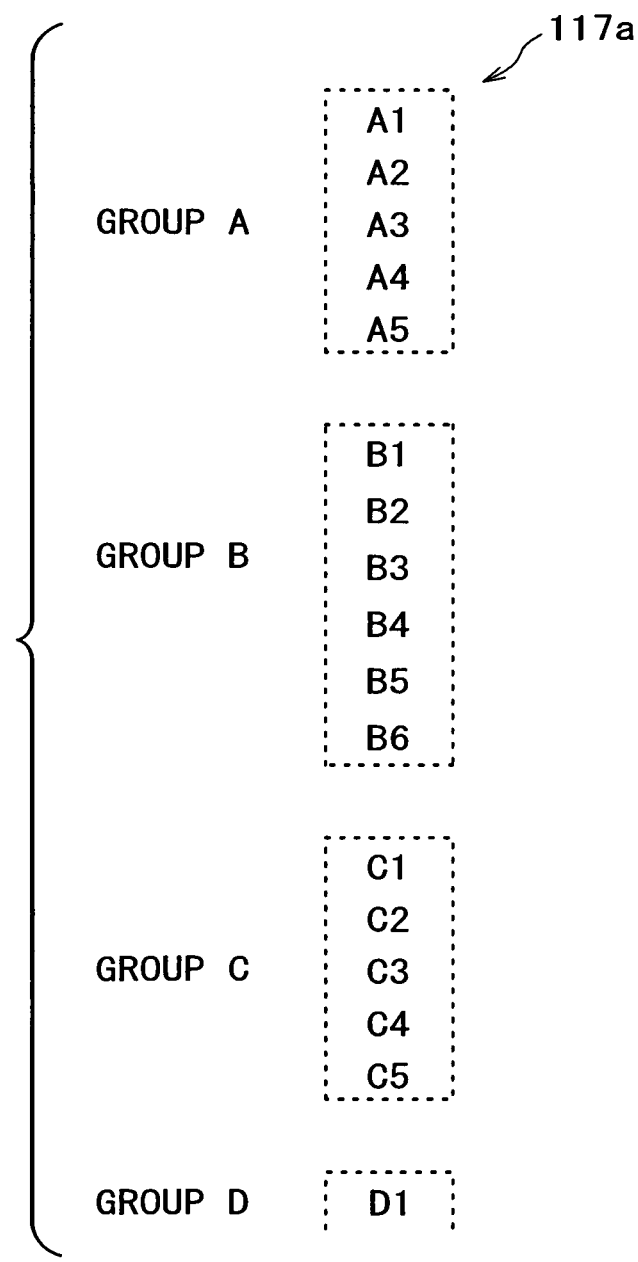

The memory 117 records list information 117a. FIG. 8 shows an example of list information 117a. The list information 117a contains individual items A1, A2, . . . , A5, B1, B2, . . . , B6, C1, C2, . . . , C5, and D1, . . . The individual items are related to groups. For example, items A1, A2, A5 are related to group A, and items B1, B2, . . . , B6 are related to group B. Items C1, C2, . . . , C5 are related to group C, and items D1, . . . are related to group D. In addition, the individual items A1, A2, . . . are provided with serial numbers. For example, item A2 is subsequent to item A1; item A3 is subsequent to item A2; and so on. Item B1 is subsequent to item A5; item B2 is subsequent to item B1; and so on. Item C1 is subsequent to item B6; item C2 is subsequent to item C1; and so on. Item D1 is subsequent to item C5; and so on. A space is placed between groups.

The group selecting portion 14a selects a group. The group selecting portion 14a comprises the holder 32, the dial main body 34, the operation dial 35, the left button 42B, and the right button 42D. When the left part of the operation dial 35 of the group selecting portion 14a is depressed, the left button 42B is pressed as a result. When the right part of the operation dial 35 of the group selecting portion 14a is depressed, the right button 42D is pressed as a result. Pressing the left button 42B is equivalent to selecting the previous group, and pressing the. right button 42D is equivalent to selecting the subsequent group. The groups are arranged in the order of ABCDE. For example, if the left button 42B is pressed with the group C selected, group B is selected. If the right button 42D is pressed at this time, group D is selected.

The list information reading portion 111a reads out list information which corresponds to a selected group and is within a predetermined range from a specific item of a predetermined serial number in the selected group. Referring to FIG. 9, the process of reading out list information will be described.

FIG. 9 illustrates an example of the process of reading out list information which works when group C is selected. The items corresponding to group C are items C1, C2, . . . , C5. It is assumed that the predetermined serial number is the top number in individual groups. Therefore, the specific item 117b is item C1. Further, it is assumed that the start of the predetermined range is the second item (item B5) precedent to the specific item and the end thereof is the fourth item (item C5) subsequent to the specific item. Therefore, the read list information 117c read out contains item B5 to item C5.

Figure 10:
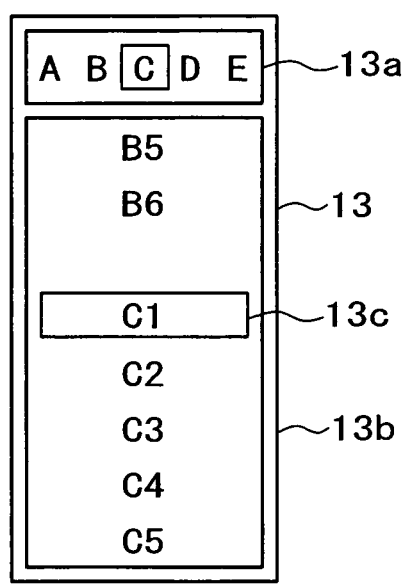
FIG. 10 is a drawing illustrating the details of the display on a display unit 13.

The display unit 13 comprises a group display portion 13a, a list display portion 13b, and a cursor display portion (specific item indicating means) 13c. Referring to FIG. 10, the display on the display unit 13 will be described.

The group display portion 13a is for displaying a selected group. In the example illustrated in FIG. 10, group C is selected. The group display portion 13a displays group names landscape. For this reason, it is easily understandable that pressing the left button 42B (right button 42D) is equivalent to selecting the previous (subsequent) group.

The list display portion 13b is for displaying read list information 117c read out by the list information reading portion 111a.

The cursor display portion (specific item indicating means) 13c positions the cursor on the specific item (item C1) so that the specific item can be discriminated from the other items.

The cursor position determining portion 111b determines the position of the cursor displayed in the cursor display portion 13c. In the example in FIG. 10, the fourth line from the top line is taken as the cursor position. The list information reading portion 111a reads out list information starting with the third item precedent to the specific item. Therefore, the cursor is positioned on the specific item (item C1).

The first scrolling portion (identifiable item changing means) 14b comprises the holder 32, the dial main body 34, the operation dial 35, the upper button 42A, and the lower button 42C. When the upper part of the operation dial 35 of the group selecting portion 14a is depressed, the upper button 42A is pressed as a result. When the lower part of the operation dial 35 of the group selecting portion 14a is depressed, the lower button 42C is pressed as a result. Pressing the upper button 42A (lower button 42C) is equivalent to changing the item identifiably indicated by the cursor to the precedent (subsequent) item. That is, this instructs the cursor position determining portion 111b to shift the cursor position upward (downward) by one line. Thus, the position of the cursor displayed in the cursor display portion 13c is changed.

If the item identifiably indicated by the cursor is positioned on the uppermost (lowermost) line in the list display portion 13b, read list information 117c is read out so that the item identifiably indicated by the cursor will remain on the uppermost (lowermost) line.

The group display portion 13a indicates a group to which the item identifiably indicated by the cursor corresponds. The group can be acquired from the list information reading portion 111a.

Figure 11:
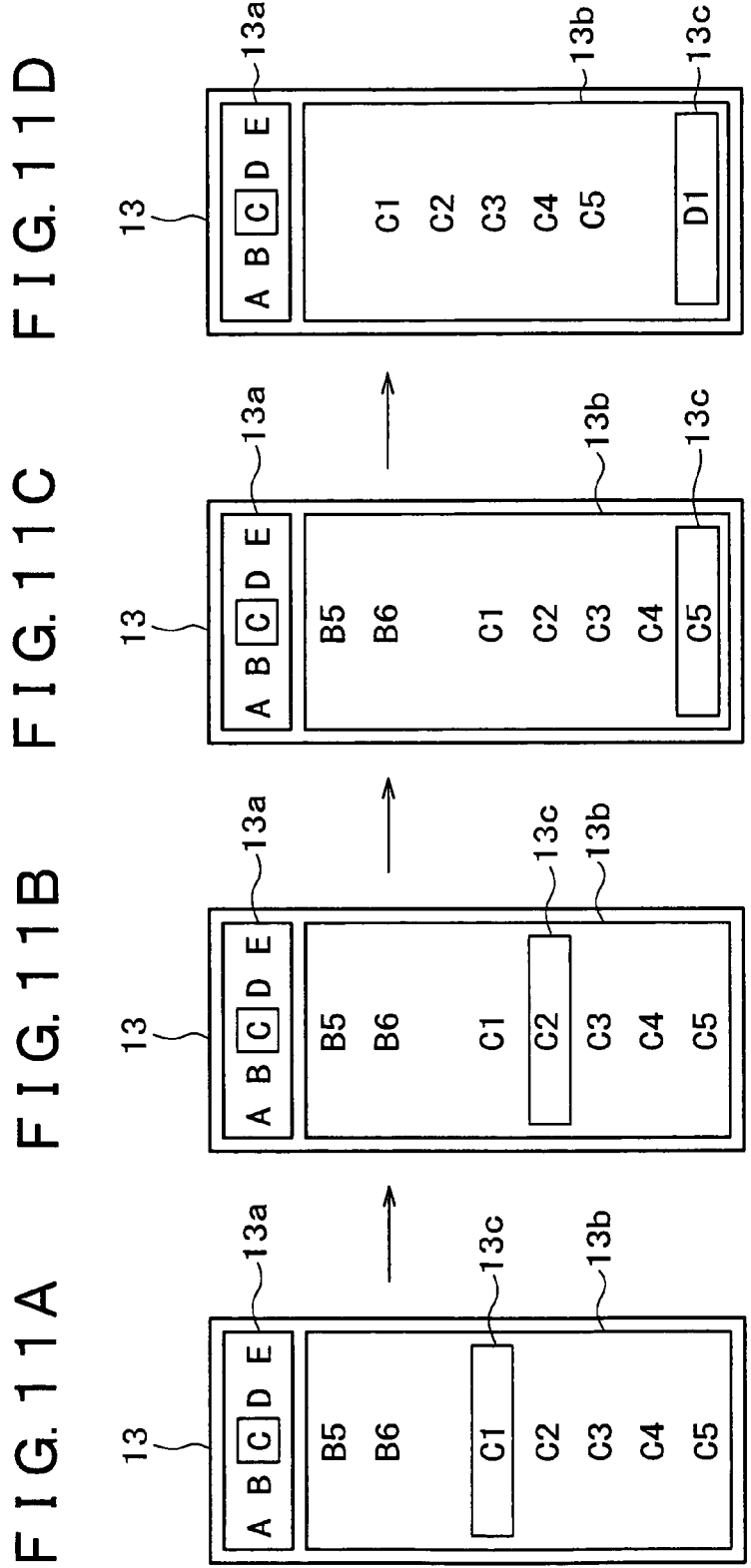
FIGS. 11A to 11D are drawings illustrating the transition of the display on the display unit 13 in response to the operation of a first scrolling portion 14b.

Referring to FIGS. 11A to 11D, the transition of the display on the display unit 13 in response to the operation of the first scrolling portion 14b will be described. It is assumed that the present display on the display unit 13 is as illustrated in FIG. 11A. If the lower button 42C is pressed at this time, that instructs the cursor position determining portion 111b to shift the cursor position downward by one line. As a result, the position of the cursor displayed in the cursor display portion 13c is shifted downward by one line. (Refer to FIG. 11B.) If the lower button 42C is repeatedly pressed, the position of the cursor displayed in the cursor display portion 13c eventually reaches the last line in the list display portion 13b. (Refer to FIG. 11C.) Up to this point, the items displayed in the list display portion 13b are unchanged (item B5 to item C5), and the position of the display is unchanged as well.

If the lower button 42C is further pressed in the state illustrated in FIG. 11C, item D1, or the item subsequent to item C5, should be identifiably indicated by the cursor. However, item D1 is not contained in the read list information 117c. Consequently, the list information reading portion 111a reads out read list information 117c so that item D1 will be contained and positioned on the lowermost line (the eighth line) in the list display portion 13b. More specifically, the list information reading portion 111a accepts item D1 from the first scrolling portion 14b, and the positioning of the cursor on the lowermost line (the eighth line) from the cursor position determining portion 111b. Then, the list information reading portion 111a reads out the seventh item (item B6) precedent to item D1 through item D1 so that item D1 will come to the last line. Then, the read list information 117c read out by the list information reading portion 111a is displayed. (Refer to FIG. 11D.) At this time, the group to which the item indicated by the cursor so that the item can be discriminated from the other items corresponds is changed from C to D. Accordingly, the group display portion 13a displays group D.

The second scrolling portion (specific item changing means) 14c comprises the scale 33, the dial main body 34, the operation dial 35, and the brushes 62A, 62B, and 62C. The operation dial 35 is turned with the central button member 36 as the axis of rotation. The amount and direction of rotation are detected based on contact between the scale 33 and the brushes 62A, 62B, and 62C, as mentioned above. Turning the operation dial 35 clockwise (counterclockwise) by a predetermined amount (e.g. 30 degrees) is equivalent to changing the specific item to the subsequent (precedent) item.

The group display portion 13a displays a group to which the specific item identifiably indicated by the cursor corresponds. The group can be acquired from the list information reading portion 111a.

The first scrolling portion 14b and the second scrolling portion 14c shares the operation dial 35 therebetween. Which portion should be actuated is determined by operating the operation dial 35. If the upper (lower) part of the operation dial 35 is pressed, the first scrolling portion 14b is actuated. If the operation dial 35 is turned, the second scrolling portion 14c is actuated.

Figure 12:
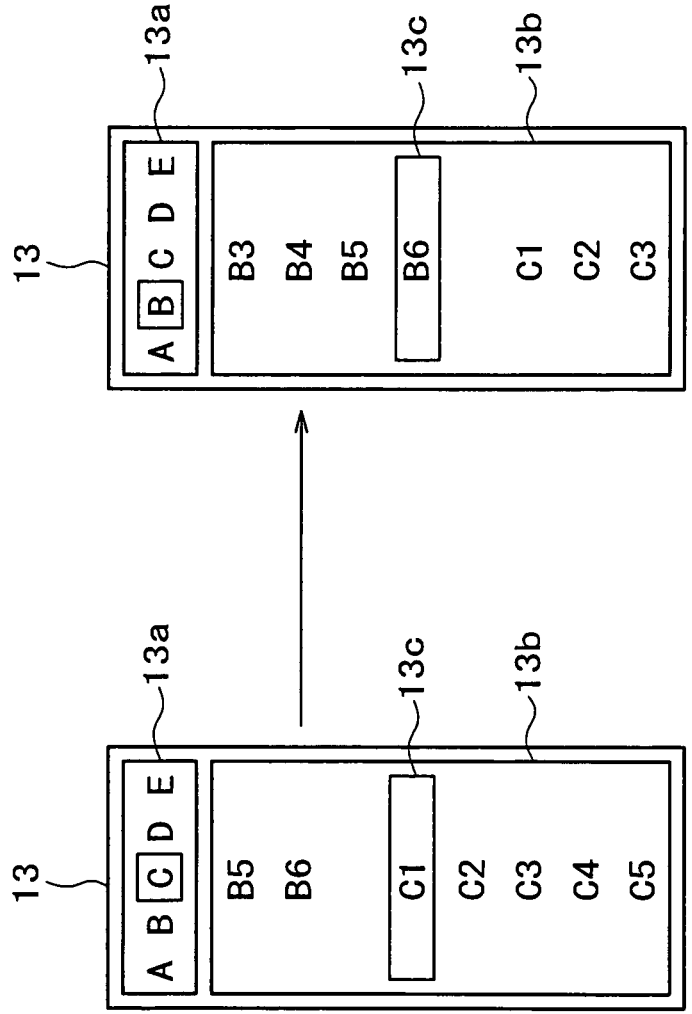
FIGS. 12A and 12B are drawings illustrating the transition of the display on the display unit 13 in response to the operation of a second scrolling portion 14c.

Referring to FIGS. 12A and 12B, the transition of the display on the display unit 13 in response to the operation of the second scrolling portion 14c will be described. It is assumed that the present display on the display unit 13 is as illustrated in FIG. 12A. If the operation dial 35 is turned counterclockwise through 30 degrees, the specific item is changed from item C1 to item B6, the item precedent thereto. Thus, the list information reading portion 111a reads out read list information 117c containing the third item (item B3) precedent to the specific item through the third item (item C3) subsequent to the specific item. The cursor is placed on the specific item B6. (Refer to FIG. 12B.) At this time, the display position of the specific item remains on the fourth line from the top while the items displayed in the list display portion 13b are changed. That is, the list display portion 13b keeps the display position of the specific item constant. A this time, the group to which the specific item indicated by the cursor so that the item can be discriminated from the other items is changed from C to B. Accordingly, the group display portion 13a displays group B.

Next, the operation of this embodiment of the present invention will be described.

Figure 13:
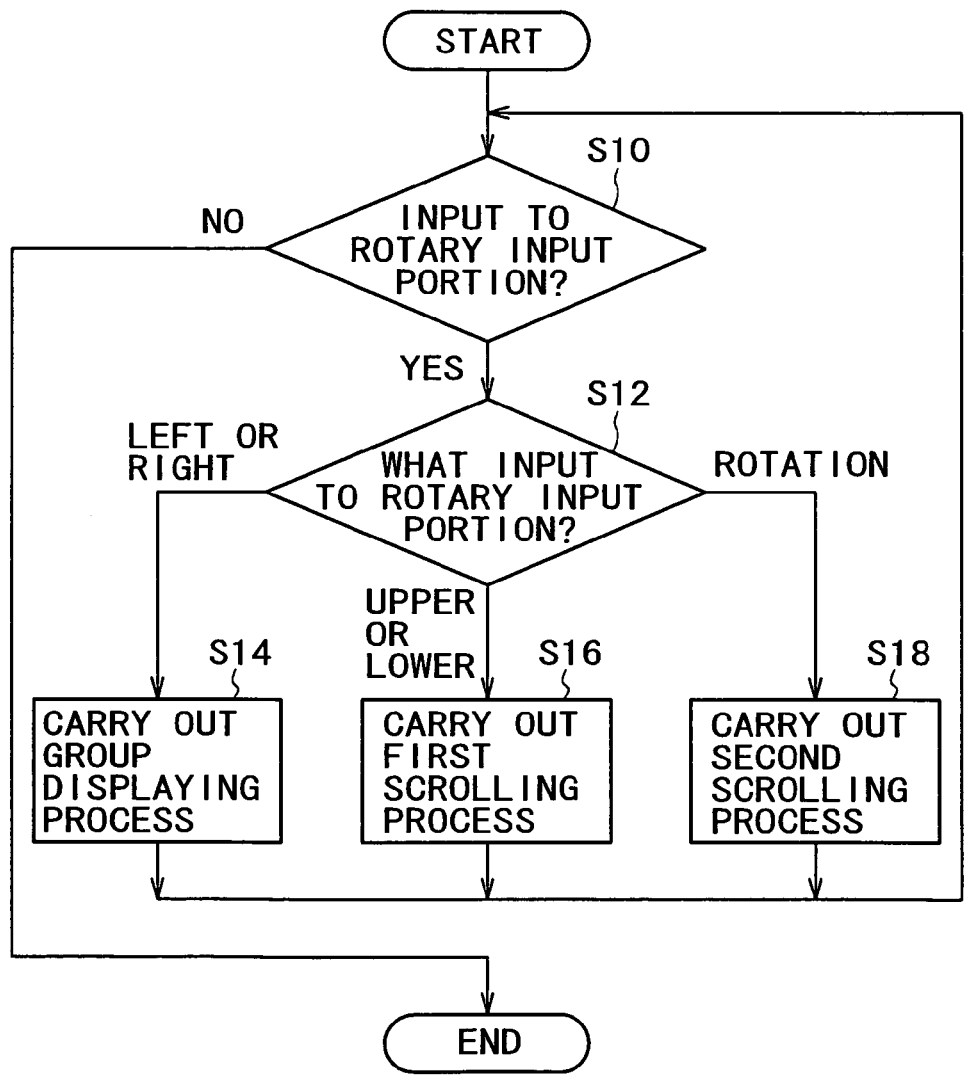
FIG. 13 is a flowchart illustrating the operation of the cellular phone 1 in the embodiment of the present invention.

FIG. 13 is a flowchart illustrating the operation of the cellular phone 1 in the embodiment of the present invention.

First, the input detection unit 115 judges whether there is any input to the rotary input portion 14 (S10). If there is input to the rotary input portion 14 (S10, Yes), the rotation detecting portion 121 and the depression detecting portion 122 judge the type of the input. That is, the portions 121 and 122 judge which the input is, the rotation of the operation dial 35, the depression of the upper (lower) button 42A(C), or the depression of the left (right) button 42B(D) (S12).

If the input is the depression of the left (right) button 42B(D) (S12, Left or right), group displaying process is carried out (S14). If the input is the depression of the upper (lower) button 42A(C) (S14, Upper or lower), first scrolling process is carried out (S16). If the input is rotation (S14, Rotation), second scrolling process is carried out (S18). Then, the operation goes back to the judgment of the presence/absence of input to the rotary input portion 14 (S10).

If there is no input to the rotary input portion 14 (S10, No), the process is terminated.

Figure 14:
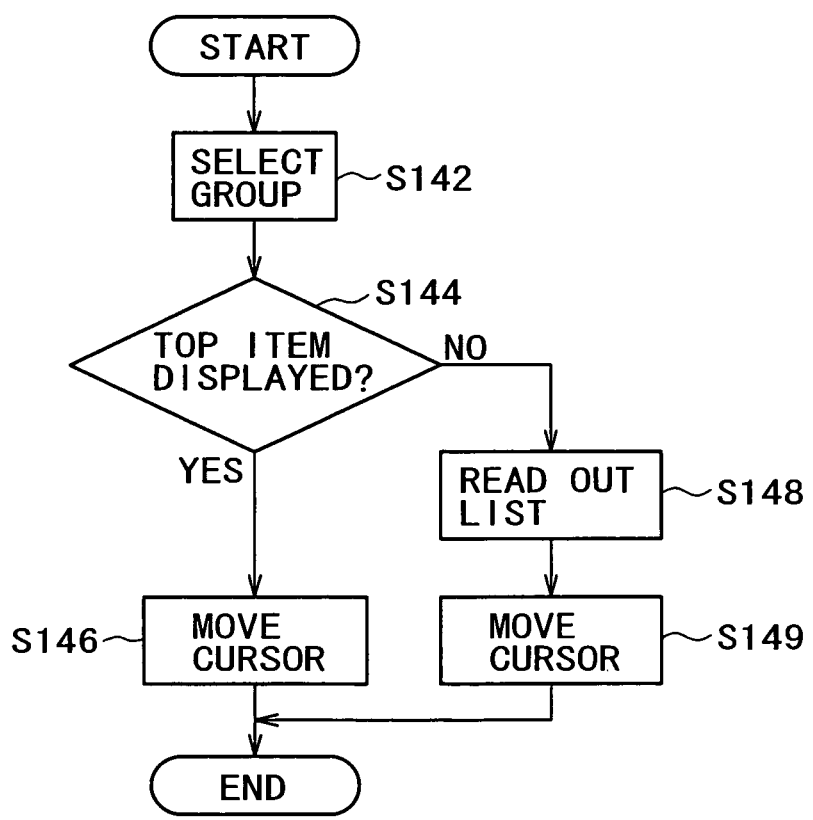
FIG. 14 is a flowchart illustrating the details of group displaying process (S14)

FIG. 14 is a flowchart illustrating the details of group displaying process (S14). First, a group is selected by depressing the left (right) button 42B(D) of the group selecting portion 14a (S142). The selected group is sent from the group selecting portion 14a to the group display portion 13a, and is displayed there. Then, the list information reading portion 111a judges whether the top item in the selected group is displayed in the list display portion 13b (S144).

If the top item in the selected group is displayed in the list display portion 13b (S144, Yes), the list information reading portion 111a sends the position of the top item in the selected group to the cursor position determining portion 111b. The cursor position determining portion 111b takes this position as the cursor position. Then, the cursor display portion 13c moves the cursor to the position of the top item in the selected group (S146). Then, the process is terminated.

If the top item (specific item) in the selected group is not displayed in the list display portion 13b (S144, No), the list information reading portion 111a reads out read list information 117c based on the specific item (S148). Then, the list display portion 13b displays the read list information 117c. Finally, the cursor display portion 13c moves the cursor to the specific item (S149), and indicates the item so that the item can be discriminated from the other items. Then, the process is terminated.

FIG. 15 is a flowchart illustrating the details of first scrolling process (S16). First, the upper (lower) button 42A(C) of the group selecting portion 14a is depressed. Then, the list information reading portion 111a judges whether the cursor has reached the uppermost (lowermost) line in the list display portion 13b (S162). If the cursor has reached the uppermost (lowermost) line in the list display portion 13b (S162, Yes), the process proceeds as follows: (Refer to FIG. 11C.) the list information reading portion 111a reads out read list information 117c so that the item identifiably indicated by the cursor will remain on the uppermost (lowermost) line. Thus, the displayed items are scrolled up (down) by one line (S164a). (Refer to FIG. 11D.) If the cursor has not reached the uppermost (lowermost) line in the list display portion 13b (S162, No), the process proceeds as follows: (Refer to FIG. 11A.) the cursor position determining portion 111b shifts the cursor position upward (downward) by one line (S164b). (Refer to FIG. 11B.)

After the completion of the processing of S164a or S164b, the list information reading portion 111a judges whether the cursor has moved to another group (S166). If not (S166, No), the process is terminated. If the cursor has moved to another group (S166, Yes), the list information reading portion 111a sends the group at which the cursor is positioned to the group display portion 13a to change the display of group (S168). (Refer to FIG. 11D.) Then, the process is terminated.

Figure 16:
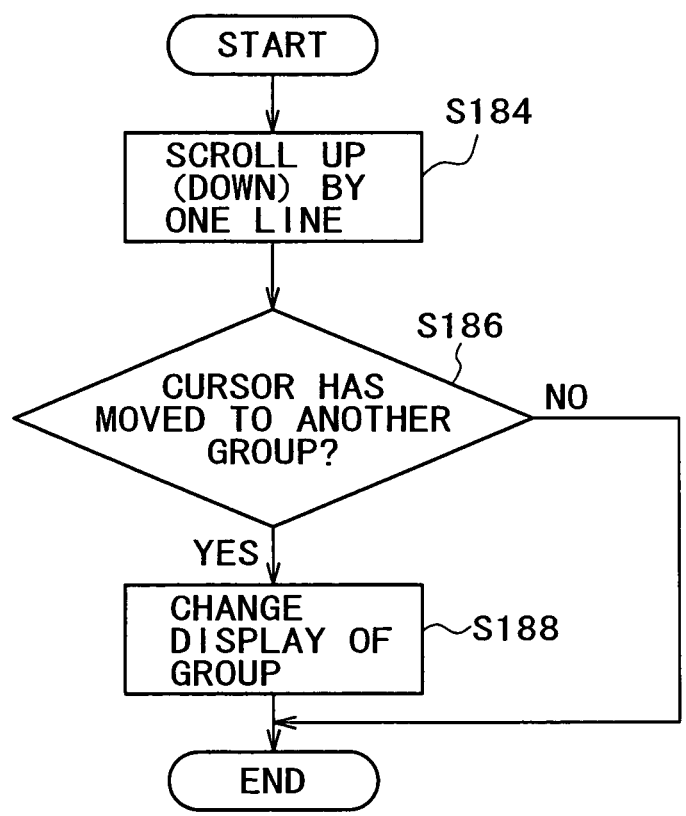
FIG. 16 is a flowchart illustrating the details of second scrolling process (S18)

FIG. 16 is a flowchart illustrating the details of second scrolling process (S18). First, the operation dial 35 of the group selecting portion 14a is turned clockwise (counterclockwise) by a predetermined amount of rotation (e.g. 30 degrees). Thus, the specific item is changed to the subsequent (precedent) item. As a result, read list information 117c read out by the list information reading portion 111a is accordingly shifted backward (forward). Therefore, the items displayed in the list display portion 13b are scrolled up (down) by one line (S184). (Refer to FIG. 12B.)

After the displayed items are scrolled (S184), the list information reading portion 11a judges whether the cursor has moved to another group (S186). If not (S186, No), the process is terminated. If the cursor has moved to another group (S186, Yes), the list information reading portion 111a sends the group at which the cursor is positioned to the group display portion 13a to change the display of group (S188). (Refer to FIG. 12B.) Then, the process is terminated.

In the embodiment of the present invention, the list information reading portion 111a reads out read list information 117c within a predetermined range from a specific item of a predetermined serial number in a selected group. In this example, the predetermined range includes the third item precedent to the specific time through the fourth item subsequent to the specific item. The specific item is the top item in the selected group. Thus, the coverage of display can be changed to a desired group, and this is convenient for browsing a great length of list information 117a.

In general, list information within a predetermined range from a specific item contains items corresponding to different groups. For example, if the top item in group C is the specific item, items corresponding to group B are contained in list information. Therefore, items corresponding to different groups (group B and group C) can be displayed at the same time.

Items can be scrolled across groups (first scrolling, second scrolling). Therefore, all the items can be browsed through, and the total number of the items can be grasped with ease.

In addition, the mode of scrolling (first scrolling, second scrolling) can be changed by operating the operation dial 35, which is a member shared between the first scrolling portion 14b and the second scrolling portion 14c. This is convenient. For example, the user can display an item the user wants by the second scrolling and thereafter move the cursor to the item by the first scrolling.

Figure 17:
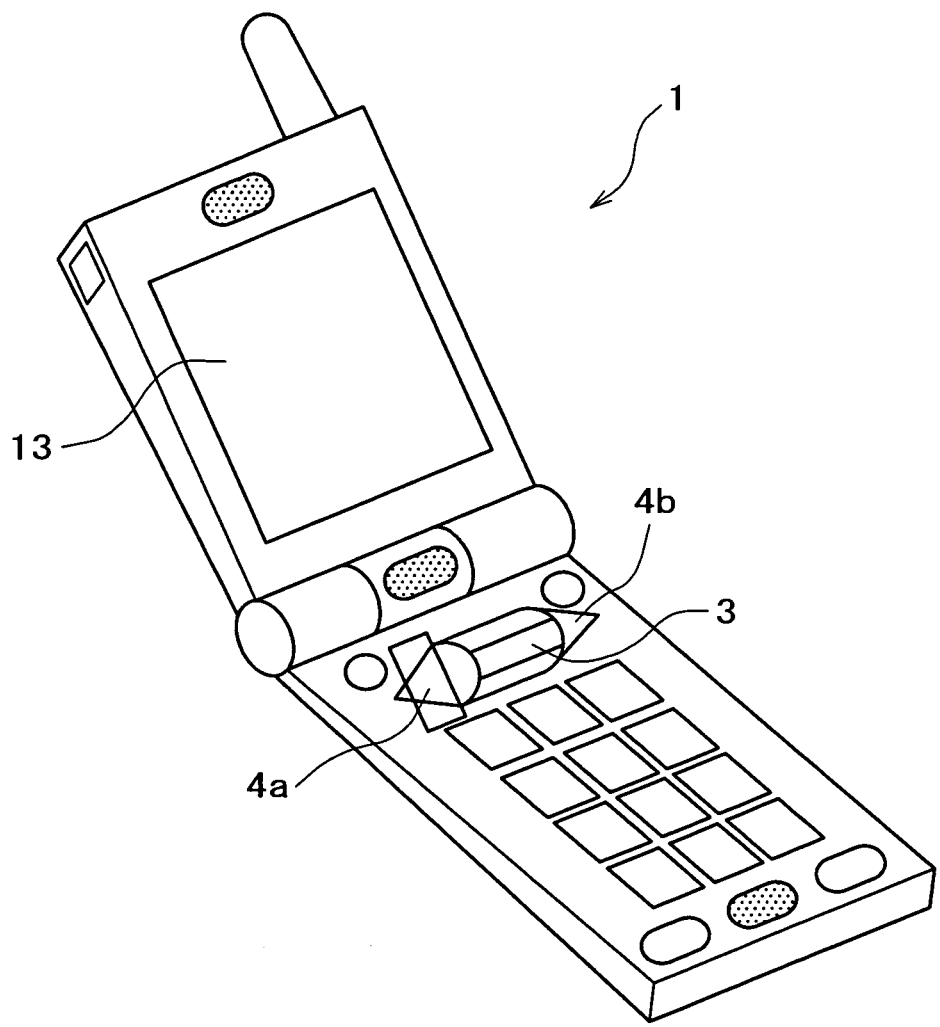
FIG. 17 is a perspective view of a cellular phone 1 provided with a jog dial.

In this embodiment of the present invention, the rotary input portion 14 is used as an input device. However, the input device is not limited to this, and a publicly known jog dial may be used as an input device. FIG. 17 is a perspective view of a cellular phone 1 provided with a jog dial.

The cellular phone 1 comprises a display unit 13, a jog dial 3, a left key 4a, and a right key 4b.

Figure 18:
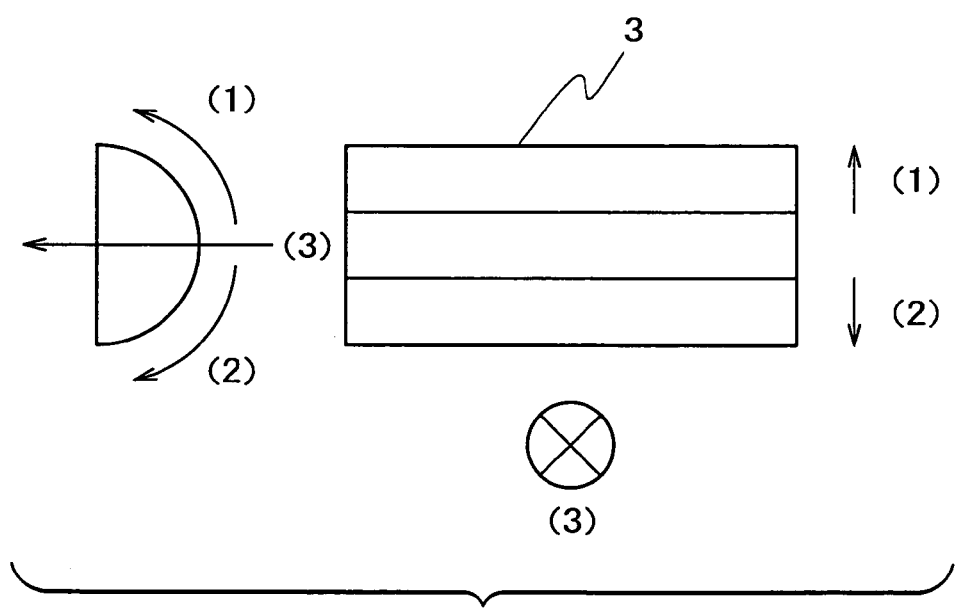
FIG. 18 is a drawing showing the plan view and the side view of the jog dial 3.

The jog dial 3 is an operation element which can be turned and depressed. FIG. 18 is a drawing showing the plan view and the side view of the jog dial 3. The jog dial 3 can be operated in three manners: (1) it can be rotated upward; (2) it can be rotated downward; and (3) it can be pressed rearward.

The operation caused when the jog dial 3 is rotated upward/downward is identical with the operation caused when the operation dial 35 is turned. The operation caused when the left key 4a or right key 4b is pressed is identical with the operation caused when the left (right) button 42B (D) is pressed.

The above embodiment is implemented as follows: a computer composed of CPU, a hard disk, flash memory, and a media (floppy disk, CD-ROM, memory stick, and the like) reading device is provided. The media reading device is caused to read a medium with programs recorded thereon which programs are for implementing the above-mentioned elements (e.g. the list information reading portion 111a, the cursor position determining portion 111b). Then, the programs are installed in the hard disk, flash memory, or the like. The above-mentioned functions can be also implemented by this method.

What is claimed is:

1. A portable information communication terminal comprising:
    memory for recording individual menu items, each individual menu item related to one of a plurality of concatenated groups, each individual menu item provided with a serial number, each group containing at least two menu items;
    group selecting device selecting one of the plurality of concatenated groups via scrolling;
    information reading unit reading out individual menu items which correspond to a selected group and which are within a predetermined range from a specific menu item having a predetermined serial number in the selected group, wherein the predetermined range starting with at least a second menu item precedent to the specific menu item, the second menu item associated with at least one group adjacent to the selected group; and
    display unit simultaneously displaying
        a first display area provided in a top area of the display unit, the first display area only displaying group names in a row direction, and
        a second display area provided separate and independent of the first display area, in a bottom area of the display unit, the second display area only displaying the menu items in the predetermined range in a column direction, the menu items in the predetermined range including the menu items in the selected group and the menu items associated with the adjacent group with a space provided therebetween,
    wherein menu items corresponding to different groups are displayed at a same time in the second display area.

2. The portable information communication terminal according to claim 1, further comprising a cursor indicating device indicating the specific menu item so that the specific menu item can be discriminated from the other menu items.

3. The portable information communication terminal according to claim 1, wherein the predetermined serial number is a top number in individual groups.

4. The portable information communication terminal according to claim 2, further comprising:
    cursor changing device changing a position of a cursor within the second display area, wherein the second display area keeps positions of displayed menu items constant while changing the position of a discriminated menu item.

5. The portable information communication according to claim 4, wherein if the discriminated menu item is positioned at an end of the second display area, the information reading unit reads out additional menu items so that the discriminated menu item can be kept at the end of the second display area by the cursor changing device.

6. The portable information communication terminal according to claim 4, wherein the first display area displays a group corresponding to the discriminated menu item.

7. The portable information communication terminal according to claim 4, wherein the first display area displays the group name corresponding to the specific menu item.

8. A program embodied on a non-transitory computer-readable medium to control a processor for a portable information communication terminal, the program for performing the steps of:

recording individual menu items, each individual menu item related to one of a plurality of concatenated groups, each individual menu item provided with a serial number, each group containing at least one item two menu items;

selecting one of the plurality of concatenated groups via scrolling;

reading out individual menu items which correspond to a selected group and which are within a predetermined range from a specific menu item having a predetermined serial number in the selected group, wherein the predetermined range starting with at least a second menu item precedent to the specific menu item, the second menu item associated with at least one group adjacent to the selected group; and simultaneously displaying a first display area provided in a top area of a display unit, the first display area only displaying group names in a row, and a second display area provided separate and independent of the first display area, in a bottom area of the display unit, the second display area only displaying the menu items in the predetermined range in a column direction, the menu items in the pre-determined range including the menu items in the selected group and the menu items associated with the adjacent group with a space provided therebetween, wherein menu items corresponding to different groups are displayed at a same time in the second display area.

9. A non-transitory computer-readable recording medium with programs recorded thereon, which programs are for causing a computer of a portable information communication terminal to carry out the steps of:

recording individual menu items, each individual menu item related to one of a plurality of concatenated groups, each individual menu item provided with a serial number, each group containing at least one item two menu items;

selecting one of the plurality of concatenated groups via scrolling;

reading out individual menu items which correspond to a selected group and which are within a predetermined range from a specific menu item having a predetermined serial number in the selected group, wherein the predetermined range starting with at least a second menu item precedent to the specific menu item, the second menu item associated with at least one group adjacent to the selected group; and simultaneously displaying a first display area provided in a top area of a display unit, the first display area only displaying group names in a row, and a second display area provided separate and independent of the first display area, in a bottom area of the display unit, the second display area only displaying the menu items in the predetermined range in a column direction, the menu items in the predetermined range including the menu items in the selected group and the menu items associated with the adjacent group with a space provided therebetween, wherein menu items corresponding to different groups are displayed at a same time in the second display area.

* * * * *